United States Patent Office 3,793,336
Patented Feb. 19, 1974

3,793,336
PROCESS FOR THE PREPARATION OF 2-AMINO-PYRIDINES
Paul Aviron Violet, Lyon, and André Blind, Villeurbanne, France, assignors to Rhone-Poulenc S.A., Paris, France
No Drawing. Filed June 26, 1970, Ser. No. 50,317
Claims priority, application France, June 30, 1969, 6922016
Int. Cl. C07d 31/42
U.S. Cl. 260—296 R         5 Claims

ABSTRACT OF THE DISCLOSURE

A new process for the preparation of primary and secondary 2-amino-pyridines, which can be used as starting materials for therapeutically active substances (e.g. anti-histamines), comprises reacting at a temperature below 200° to 500° C. a 2-hydroxypyridine of the formula:

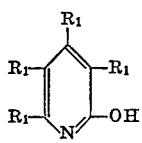

with an amine $H_2N—R$, wherein the symbols $R_1$ represent hydrogen, alkyl, cycloalkyl, aryl or aralkyl, or the symbols $R_1$ on adjacent carbon atoms form a divalent saturated or unsaturated radical, and R has the same significance as $R_1$ or represents a monovalent heterocyclic aromatic radical.

---

The present invention relates to a process for the preparation of 2-amino-pyridines in particular of 2-amino-pyridines of general formula:

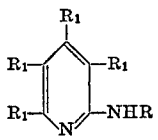

in which each of the symbols $R_1$, which may be the same or different, represents a hydrogen atom or an alkyl, cycloalkyl, aryl or aralkyl radical, or two symbols $R_1$ on adjacent carbon atoms can form a divalent saturated or unsaturated radical, thus forming a ring with the two carbon atoms of the pyridine ring to which they are attached; R is the same as $R_1$ or represents a monovalent heterocyclic aromatic radical.

Numerous industrial processes for the preparation of 2-amino-pyridines are known. The most advantageous process for obtaining 2-amino-pyridine itself involves reacting pyridine with sodium amide in N,N-dimethylaniline. This reaction, which was originally described by Chichibabin and Zeide [J. Russ. Phys. Chem. Soc., 46, 1216 (1914); C.A., 9, 1901 (1915)] takes place with satisfactory yield; however, since it is necessary to carry out the reaction in an anhydrous medium and to use sodium amide, the process is expensive. Furthermore, this process is restricted to the preparation of 2-amino-pyridines with a primary amino grouping; in order to prepare 2-amino-pyridines containing a secondary amino grouping it is necessary first to prepare a 2-halogenopyridine (generally starting from pyridine itself) and then to react it with a primary amine.

It has now been found, according to the present invention, that both primary and secondary 2-amino-pyridines of Formula I can be prepared by a process which comprises reacting, at a temperature of between 200 and 500° C., a 2-hydroxy-pyridine of the formula:

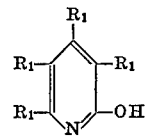

with an amine of the formula:

$$H_2N—R \qquad (III)$$

in which $R_1$ and R are as defined above.

More particularly, the process according to this invention comprises reacting a 2-hydroxy-pyridine of Formula II, with ammonia or an amine of Formula III by heating the reagents to a temperature of between 200 and 500° C., preferably between 250 and 400° C. There should be at least one mole of amine present per mole of hydroxy-pyridine. It is possible to use a large excess of amine without affecting the reaction, but, in practice, a molar ratio of amine/hydroxypyridine of from 2:1 to 15:1 is preferred so as not to generate an excessive pressure, particularly when amines of low boiling point are employed.

In order to achieve a rate of reaction which is not excessively slow, it is desirable to introduce certain minimum amounts of reagents into the apparatus so that the pressure generated is sufficiently high. These minimum amounts, and hence the pressure, evidently depend on the particular reagents employed and it is not possible to specify a preferred range without prior routine experiment. It is, however, evident that the higher the pressure at which the reaction is carried out, the more volatile are the reagents. Thus, in the case of ammonia and 2-hydroxy-pyridine, this pressure can be of the order of 20 to 400 bars and is preferably between 50 and 150 bars.

The reaction can be carried out in the presence or absence of solvents. As a general rule, the use of solvents is not essential because the reagents are mostly liquid under the reaction conditions. However, if one of the reagents has a high melting point it can be advantageous to add a chemically inert compound which, being liquid under the reaction conditions, favors the formation of a solution with the reagents.

When the reaction is complete, the 2-amino-pyridines may be extracted from the reaction medium by any known means; distillation under reduced pressure is particularly valuable.

2-hydroxy-pyridine can be prepared, for example, from glutaric acid: first, the glutaric acid is converted into δ-valerolactam, for example in accordance with the technique described in French Pat. 879,918 and then, in a second stage, the valerolactam is dehydrogenated to give 2-hydroxy-pyridine in accordance with the technique described by Galimovsky and Späth [Ber., 69, 2059 (1936)].

The process of the present invention is particularly valuable for the preparation of 2-amino-pyridines of General Formula I in which each of the symbols $R_1$, which may be the same or different, represents a hydrogen atom or a straight or branched alkyl radical containing 1 to 6 carbon atoms, a cycloalkyl radical containing 5 or 6 carbon atoms, an alkylphenyl radical or a phenylalkyl radical in which the alkyl moiety contains 1 to 6 carbon atoms and in which the phenyl nucleus is optionally substituted by one or more additional alkyl radicals containing 1 to 6 carbon atoms, or two adjacent symbols $R_1$ form a divalent saturated or unsaturated radical containing 3 or 4 carbon atoms, and R is the same as $R_1$ or represents a monovalent nitrogen-containing heterocyclic aromatic radical.

By way of illustration, the following 2-hydroxy-pyridines of Formula II may be quoted: 2-hydroxy-pyridine, 3-methyl-2-hydroxy-pyridine, 4-butyl-2-hydroxy-pyridine, 4-cyclohexyl - 2 - hydroxy-pyridine, 4-phenyl-2-hydroxy-pyridine, 3,5 - dimethyl - 2 - hydroxy-pyridine, 2-hydroxy-quinoline or 1-hydroxy-isoquinoline i.e. $R_1$ represents a methyl, butyl, cyclohexyl or phenyl radical or two adjacent $R_1$ symbols form, with the carbon atoms to which they are attached, a benzene ring.

Suitable amines of Formula III include: ammonia, methylamine, propylamine, cyclohexylamine, aniline, 2-amino-pyridine and 4-amino-pyridine i.e. R represents hydrogen or a methyl, propyl, cyclohexyl, phenyl or pyridyl radical.

The 2-amino-pyridines of Formula I are of great industrial interest as starting materials for the preparation of therapeutically active derivatives, in particular antihistamines.

The following examples further illustrate the present invention.

EXAMPLE 1

2-hydroxy-pyridine (2.23 g.) and gaseous ammonia (6 g.) were introduced into a 125 cc. autoclave and the autoclave was heated to 300° C. over 3½ hours. The pressure in the autoclave was about 100 bars. After cooling, the solid reaction mass was extracted with methanol. After concentrating the extracts, a residue (2.155 g.) was obtained, containing 65.9% of 2-amino-pyridine and 31.6% of 2-hydroxypyridine (as determined by vapor phase chromatography using a 50% methanol solution). Distillation under reduced pressure yielded a fraction of boiling point$_{20}$=105° C., weighing 1.1 g. and corresponding to 2-amino pyridine, the latter being identified by infra-red spectroscopy and by its mass spectrum.

EXAMPLE 2

2-hydroxy-pyridine (7.8 g.) and gaseous ammonia (32 g.) were introduced into a 125 cc. autoclave. During the rise in temperature to 350° C., ammonia gas was regularly released so as to keep the pressure at about 150 bars. Thereafter the mixture was left at 350° C. for 3 hours. After cooling, extraction with methanol and concentration of the extracts gave a solid (7.9 g.) containing 91% of 2-amino-pyridine (determined by vapor phase chromatography). The solid was dissolved in an aqueous solution (80 cc.) of potassium hydroxide, containing 20 g. of potassium hydroxide per 100 cc. of solution; after extraction with ether, followed by concentration of the extracts, 2-amino-pyridine was obtained.

EXAMPLE 3

The procedure of Example 2 was carried out for 3 hours at 250° C. but with the ammonia gas being released such that the pressure in the autoclave is 50 bars. A residue (7.5 g.) was obtained, which contains 70% of 2-amino-pyridine (determined by vapor phase chromatography).

EXAMPLE 4

2-hydroxy-6-methyl-pyridine (2.56 g.) and gaseous ammonia (6 g.) were introduced into a 125 cc. autoclave. The autoclave was heated to 300° C. over 3½ hours, whilst the pressure settled at around 100 bars. After cooling, extraction with methanol and removal of the solvent gave a residue (2.57 g.), from which 2-amino-6-methyl-pyridine (0.77 g.) was isolated by distillation under reduced pressure.

EXAMPLE 5

2-hydroxy-pyridine (5 g.) and aniline (5 g.) were introduced into a 125 ml. autoclave. The autoclave was heated to 350° C. for 5 hours. After cooling, the reaction mass was extracted with methanol. Concentration of the extracts yielded a residue (9.2 g.) containing 30.3% of 2-(phenylamino)pyridine (determined by vapor phase chromatography).

EXAMPLE 6

2-hydroxy-pyridine (5 g.) and 2-amino-pyridine (5 g.) were introduced into a 125 ml. autoclave and the autoclave was heated to 350° C. for 5 hours. After cooling, extraction with methanol and concentration of the extracts gave a residue (9.33 g.) which contained 41.5% of dipyridylamine (determined by vapor phase chromatography). It was furthermore found that the 2-hydroxy-pyridine had indeed disappeared. The residue was suspended in water (200 cc.) and the suspension extracted with ether (4× 50 cc.). The extracts were concentrated and the resulting residue was recrystallized from a mixture (50 cc.) of water-ethanol, 50/50 by volume. Dipyridylamine (2 g.) melting at 94–95° C. was thus obtained.

We claim:

1. A process for the preparation of a 2-amino-pyridine of the formula:

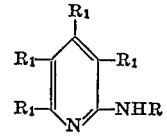

in which each of the symbols $R_1$, which may be the same or different, represents hydrogen, a straight or branched alkyl radical of 1 to 6 carbon atoms, a cycloalkyl radical of 5 or 6 carbon atoms, phenyl, an alkylphenyl or phenylalkyl radical in which the alkyl moiety contains 1 to 6 carbon atoms or two adjacent symbols $R_1$ represent a divalent saturated or unsaturated radical of 3 or 4 carbon atoms, not more than 2 of the radicals $R_1$ being other than hydrogen, and R is the same as $R_1$ or represents pyridyl, which comprises contacting a 2-hydroxy-pyridine of the formula:

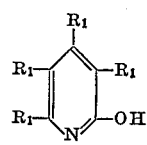

with an amine of the formula: $NH_2R$, in which R and $R_1$ are as defined above, at a temperature of between 200 and 500° C.

2. A process according to claim 1 in which the symbol $R_1$ in the 6-position is other than hydrogen and the remaining symbols $R_1$ are all hydrogen.

3. A process according to claim 1 in which $R_1$ and R both represent hydrogen.

4. A process according to claim 1 in which the molar ratio of amine to hydroxy-pyridine is from 2:1 to 15:1.

5. A process according to claim 1 in which the temperature is between 250° and 400° C.

References Cited

UNITED STATES PATENTS 3,495,969    2/1970    Driscoll _____ 260—296 R

OTHER REFERENCES

Fieser & Fieser: Advanced Organic Chemistry, Reinhold Publishers, pp. 634–35 (1961).

ALAN L. ROTMAN, Primary Examiner